United States Patent
Reilly

[19]

[11] Patent Number: 6,142,402
[45] Date of Patent: Nov. 7, 2000

[54] SLANTED TAPE LEADER BLOCK

[75] Inventor: Steven J. Reilly, Northglenn, Colo.

[73] Assignee: Storage Technology Corporation, Louisville, Colo.

[21] Appl. No.: 09/390,819

[22] Filed: Sep. 7, 1999

[51] Int. Cl.[7] .................................................. G03B 1/58
[52] U.S. Cl. .................................... 242/332.8; 242/348.2; 242/532.6
[58] Field of Search .......................... 242/332.4, 332.8, 242/348.2, 532.6, 587.1, 587.2; 360/132

[56] References Cited

U.S. PATENT DOCUMENTS

| | | | |
|---|---|---|---|
| 4,350,309 | 9/1982 | Richard et al. | 242/587.1 X |
| 4,399,936 | 8/1983 | Rueger | 242/332.4 X |
| 4,399,959 | 8/1983 | Godsoe et al. | 242/332.4 |
| 5,431,356 | 7/1995 | Horstman et al. . | |
| 5,443,220 | 8/1995 | Hoge et al. | 242/332.8 |
| 5,465,187 | 11/1995 | Hoge et al. | 242/348.2 X |
| 5,883,771 | 3/1999 | Hoerger | 242/348.2 X |

*Primary Examiner*—Donald P. Walsh
*Assistant Examiner*—William A. Rivera
*Attorney, Agent, or Firm*—Brooks & Kushman P.C.

[57] ABSTRACT

A take-up reel assembly for use with a tape cartridge in a cartridge-based tape transport includes a take-up reel and a leader block. The take-up reel includes an annular hub and first and second tape guides having first and second generally flat guide surfaces, respectively. The hub has an axis of rotation, an annular hub surface extending between the guide surfaces, and a hub slot extending from the hub surface toward the axis of rotation. The leader block is adapted to be attached to a free end of a length of tape stored in the cartridge, and is further disposable in the hub slot. The leader block includes an arcuate end surface having first and second leader-block edges that extend between the guide surfaces when the leader block is disposed in the hub slot. At least a portion of each of the leader-block edges extends in a direction non-perpendicular to the guide surfaces when the leader block is disposed in the hub slot.

14 Claims, 3 Drawing Sheets

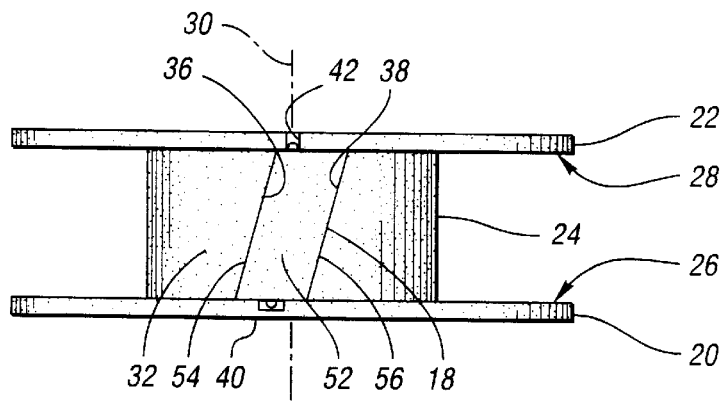
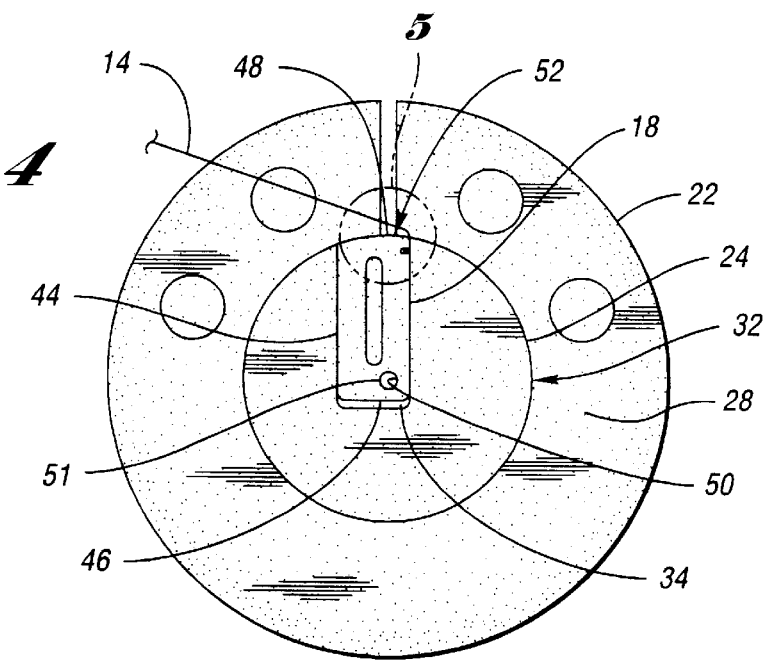
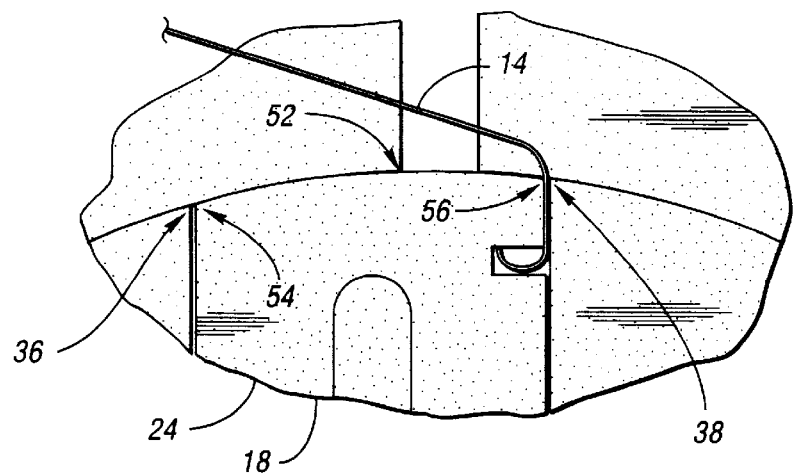

SLANTED TAPE LEADER BLOCK

TECHNICAL FIELD

The invention relates to a take-up reel assembly for use with a tape cartridge in a tape transport, and the reel assembly includes a slanted leader block.

BACKGROUND ART

Magnetic tape is frequently used to store digital data thereon. Such tape may be housed in a tape cartridge that protects the tape from damage. A leader block attached to a free end of the tape is used to withdraw the tape from the cartridge for read/write operations.

Read/write operations are performed by a tape transport that is configured to receive the cartridge. A threading mechanism, such as a threading or loading post, grabs the leader block and pulls it free from the cartridge. The threading mechanism then pulls the leader block through a series of guide posts or bearings, across a longitudinal read/write head, and into a slot in a take-up reel to thereby thread the tape through the tape transport. Once threaded, the tape from the cartridge can be driven across the read/write head for data transfer operations, and wound on a hub of the take-up reel.

The leader block and the take-up reel are precisely manufactured so that when the leader block is inserted into the slot in the take-up reel, the slot is sufficiently closed by an end of the leader block to create a relatively smooth surface on the hub of the take-up reel. Ideally, the leader block should cover the slot such that the interface between the end of the leader block and the hub is perfectly smooth. Such a perfectly smooth interface, however, is not practical to manufacture. Therefore, small discontinuities between the leader block and the hub are always present. Such discontinuities can cause impressions in the first wraps of the tape around the hub. These impressions may affect the retrievability of data stored on the tape, which results in data errors.

To ensure data integrity, a known practice involves not writing data to the portions of the tape having impressions. For example, if the first 100 wraps of the tape are effected by tape impressions, then no data is stored on the first 100 wraps of the tape. Such a practice, however, results in wasted data storage capability and wasted time.

U.S. Pat. No. 5,431,356 discloses a take-up reel assembly that is configured to reduce tape impressions. The take-up reel assembly includes a take-up reel having radiused hub edges, and a leader block that also has radiused edges. The edges of the leader block mate with the hub edges to form a continuous, relatively smooth surface on which tape may be wound.

DISCLOSURE OF INVENTION

The invention is an improved a take-up reel assembly for use with a tape cartridge in a cartridge-based tape transport, and the tape cartridge includes a length of tape stored on a supply reel. The take-up reel assembly includes a take-up reel for receiving the tape from the cartridge, and a leader block. The take-up reel includes an annular hub and first and second tape guides having first and second generally flat guide surfaces, respectively. The hub has an axis of rotation, an annular hub surface extending between the guide surfaces, and a hub slot extending from the hub surface toward the axis of rotation. The leader block is adapted to be attached to a free end of the tape and is disposable in the hub slot. The leader block includes an arcuate end surface having first and second leader-block edges that extend between the guide surfaces when the leader block is disposed in the hub slot. At least a portion of each of the leader-block edges extends in a direction non-perpendicular to the guide surfaces when the leader block is disposed in the hub slot.

The hub slot preferably has a size and shape corresponding to the leader block. Furthermore, the hub surface preferably has first and second hub edges that substantially mate with the first and second leader-block edges, respectively.

With such a configuration, any tape imprints or impressions caused by the hub edges and/or the leader block edges will be staggered across the tape. As a result, not all of the tracks of the tape will be affected by such imprints or impressions at a particular longitudinal location on the tape. Advantageously, a data error recovery circuit or system can be used to correct the affected tracks, thereby allowing read/write operations to be performed on the tape.

In one embodiment of the invention, the leader-block edges are generally straight and are parallel to each other. Alternatively, the leader-block edges may be non-parallel.

According to a feature of the invention, the leader block has a slanted groove adapted to receive the free end of the tape. Because the groove is slanted, the tape is able to lay flat over the end surface of the leader block.

Further under the invention, a take-up reel assembly for use with a tape cartridge in a cartridge-based tape transport includes a leader block and a take-up reel for receiving tape from the cartridge. The leader block is adapted to be attached to a free end of the tape, and includes a body having an arcuate end surface and a body cross-section shaped generally as a quadrilateral having non-perpendicular adjacent sides. The take-up reel includes an annular hub. The hub has an axis of rotation, an annular hub surface, and a hub slot extending from the hub surface toward the axis of rotation for receiving the leader block. The hub slot has a slot cross-section corresponding to the body cross-section.

Preferably, the body cross-section is shaped generally as a parallelogram such that opposite sides are parallel.

A method for limiting deleterious effects resulting from imprints on a magnetic tape having multiple tracks for storing data is also disclosed.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 3 is a side view of the take-up reel assembly;

FIG. 4 is a top view of the take-up reel assembly with the first tape guide removed, and showing the leader block disposed in a radial slot of the annular hub;

FIG. 5 is an enlarged view of a portion of FIG. 4 showing mating edges of the hub and leader block;

BEST MODES FOR CARRYING OUT THE INVENTION

Figure 1:
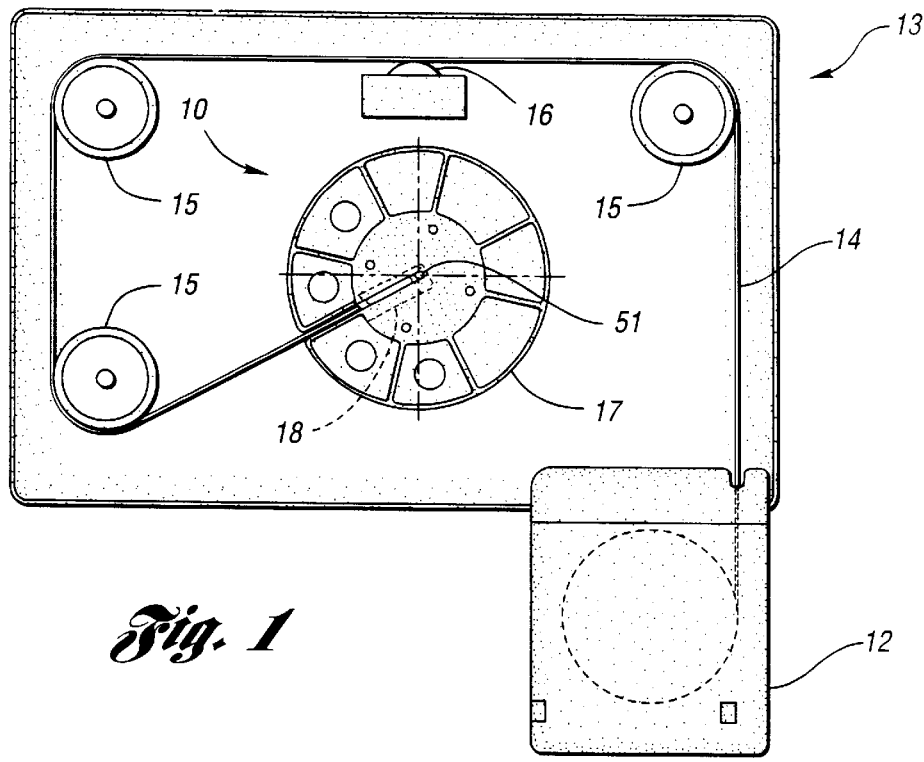
FIG. 1 is a schematic diagram of a take-up reel assembly according to the invention for use with a tape cartridge in a cartridge-based tape transport.
Figure 2:
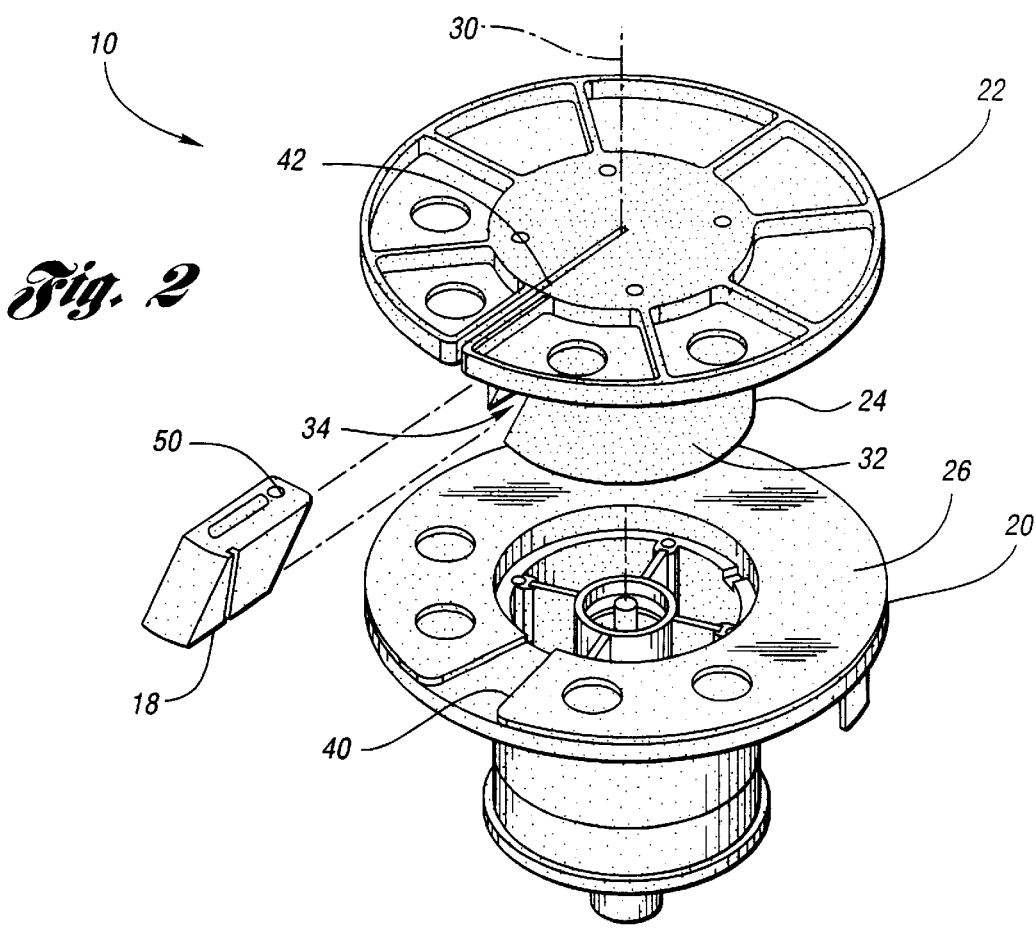
FIG. 2 is an exploded perspective view of the take-up reel assembly including a take-up reel and a leader block, the take-up reel having an annular hub and first and second tape guides.

FIG. 1 shows an exemplary take-up reel assembly 10 according to the invention for use with a tape cartridge 12 in a cartridge-based tape transport 13. The tape cartridge 12 includes magnetic recording tape 14 wound on a supply reel, and the tape 14 has multiple longitudinal tracks for storing data. The tape transport 13 includes multiple guide posts or bearings 15 and a read/write head 16 for performing read/write operations on the tape 14.

Referring to FIGS. 1 through 5, the take-up reel assembly 10 includes a take-up reel 17 and a slanted leader block 18 attached to a free end of the tape 14. The take-up reel 17 is configured to couple with the leader block 18, and to allow tape 14 to be wound thereon. The take-up reel 17 includes first and second tape guides 20 and 22, respectively, and an annular hub 24. The first and second tape guides 20 and 22 have first and second generally flat guide surfaces 26 and 28, respectively, that are parallel to each other.

Figure 6:
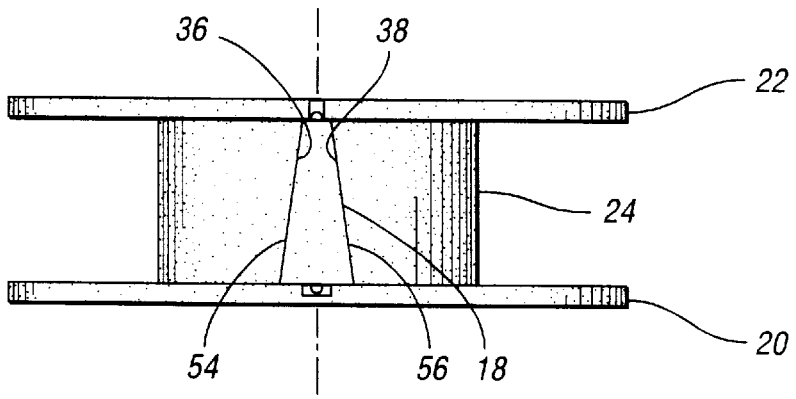
FIG. 6 is a side view similar to FIG. 3 of an alternative configuration of the take-up reel assembly.

The hub 24 has an axis of rotation 30, an annular hub surface 32 extending between the guide surfaces 26 and 28, and a radial hub slot 34 extending from the hub surface 32 toward the axis 30 for receiving the leader block 18. The hub surface 32 has first and second hub edges 36 and 38, respectively, that extend between the guide surfaces 26 and 28. Furthermore, a major portion of each hub edge 36 and 38 extends in a direction non-perpendicular to the guide surfaces 26 and 28. Preferably, the hub edges 36 and 38 are generally straight and are parallel to each other. Furthermore, each of the hub edges 36 and 38 preferably forms an angle in the range of 80 to 85 degrees with each of the guide surfaces 26 an 28. Alternatively, the hub edges 36 and 38 may be non-parallel, such as shown in FIG. 6.

Returning to FIGS. 2 and 3, the first and second tape guides 20 and 22 are also provided with first and second radial guide slots 40 and 42, respectively, to facilitate insertion of the leader block 18 into the hub slot 34.

Referring to FIGS. 3 through 5, the leader block 18 includes a body 44 disposable in the hub slot 34 and having first and second ends 46 and 48, respectively. At or proximate to the first end 46, the body 20 includes an aperture 50 that is configured to couple to a threading or loading post 51 of the tape transport 13. Alternatively, the body 20 may be provided with a notch, groove or any other suitable surface that is configured to couple to the loading post 51.

The second end 48 has a curved end surface 52 that is disposed proximate the hub surface 32 when the leader block 18 is disposed in the hub slot 34. The end surface 52 has first and second leader-block edges 54 and 56 that extend between the guide surfaces 26 and 28 when the leader block 18 is disposed in the hub slot 34. Furthermore, a major portion of each leader-block edge 54 and 56 extends in a direction non-perpendicular to the guide surfaces 26 and 28 such that the leader-block edges 54 and 56 mate closely with the hub edges 36 and 38. Preferably, the leader-block edges 54 and 56 are generally straight and are parallel to each other. Furthermore, each of the leader-block edges 54 and 56 preferably forms an angle in the range of 80 to 85 degrees with each of the guide surfaces 26 an 28. Alternatively, the leader-block edges 54 and 56 may be non-parallel, such as shown in FIG. 6.

Figure 7:
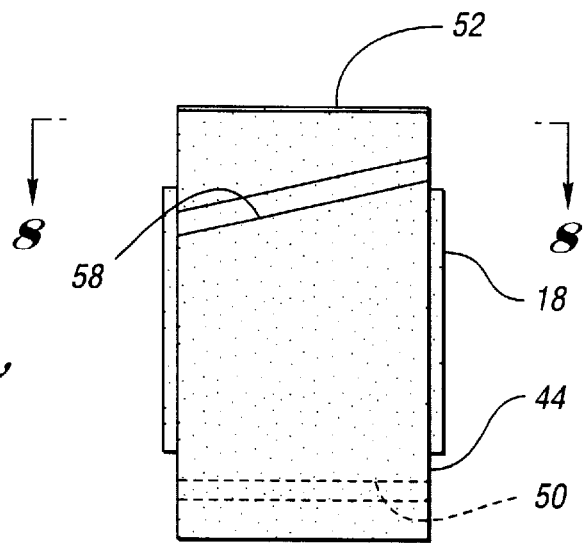
FIG. 7 is a side view of the leader block illustrated in FIGS. 1 through 5, and showing a slanted groove for receiving tape from the tape cartridge.

As shown in FIG. 7, the body 44 also has a slanted notch or groove 58 for coupling the leader block 18 to the tape 14.

The groove 58 is slanted such that the tape 14 will lay flat over the end surface 52 when the tape 14 is wound around the hub surface 32 and the end surface 52.

Figure 8:
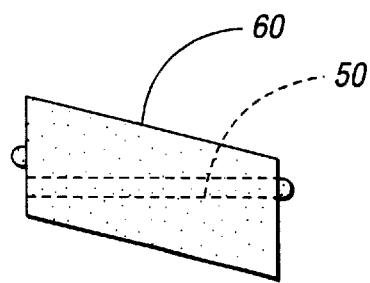
FIG. 8 is a sectional view of the leader block taken along line 8—8 of FIG. 7.

Furthermore, as shown in FIG. 8, the body 44 has a body cross-section 60 that is shaped as a quadrilateral having non-perpendicular adjacent sides. Preferably, the body cross-section 60 is shaped as a parallelogram such that opposite sides are parallel.

The take-up reel 17 and the leader block 18 are preferably made of molded plastic, such as poly-carbonate. Alternatively, the take-up reel 17 and leader block 18 may be made of any suitable material and in any suitable manner. For example, the tape guides 20 and 22 of the take-up reel 17 may be made of cast aluminum, while the annular hub 24 may be made of plastic.

To use the take-up reel assembly 10, the tape cartridge 12 is positioned in or proximate to the tape transport 13, shown in FIG. 1. The loading post 51 of the tape transport 13 is then inserted through the aperture 50 of the leader block 18. Next, the loading post 51 is used to pull the leader block 18 through or around the guide bearings 15, across the read/write head 16, and into the hub slot 34 in the take-up reel 17 to thereby thread the tape 14 through the tape transport 13. Once threaded, the tape 14 can be driven across the read/write head 16 for data transfer operations, and wound on the hub 24 of the take-up reel 17.

Advantageously, because the hub edges 36 and 38 and the leader-block edges 54 and 56 are slanted as described above in detail, any tape imprints or impressions caused by the hub edges 36 and 38 and/or the leader block edges 54 and 56 will be staggered across the tape 14. As a result, not all of the tracks of the tape 14 will be affected by such imprints or impressions at a particular longitudinal location on the tape 14. Furthermore, the imprints or impressions will be staggered across the read/write head 16 of the tape transport 13 during a read/write operation. Consequently, a data error recovery circuit or system of the tape transport 13 can be used to correct affected tracks, thereby allowing the tape transport 13 to read and/or write on a tape that has such imprints or impressions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the invention may be used in a two-reel tape cassette in which a distal end of a length of tape is permanently attached to a take-up reel. The attachment may be performed by a key piece that is snapped or otherwise secured in a matching groove in the take-up reel. Although the need for a removable leader block is not present, the key piece and groove may be slanted as described above to minimize tape imprints or impressions.

What is claimed is:

1. A take-up reel assembly for use with a tape cartridge in a cartridge-based tape transport, wherein the cartridge includes a length of tape stored on a supply reel, the take-up reel assembly comprising:

a take-up reel for receiving the tape from the cartridge and including an annular hub and first and second tape guides having first and second guide surfaces, respectively, the hub having an axis of rotation, an annular hub surface extending between the guide surfaces, and a hub slot extending from the hub surface toward the axis of rotation; and a leader block adapted to be attached to a free end of the tape and being disposable in the hub slot, the leader block including an end surface having first and second leader-block edges that extend between the guide surfaces when the leader block is disposed in the hub slot, at least a portion of each of the leader-block edges extending in a direction non-perpendicular to the guide surfaces when the leader block is disposed in the hub slot.

2. The take-up reel assembly of claim 1 wherein the hub slot has a size and shape corresponding to the leader block.

3. The take-up reel assembly of claim 1 wherein the leader-block edges are generally straight.

4. The take-up reel assembly of claim 3 wherein the leader-block edges are parallel.

5. The take-up reel assembly of claim 3 wherein the hub surface has first and second hub edges that substantially mate with the first and second leader-block edges, respectively.

6. The take-up reel assembly of claim 1 wherein the leader block has a slanted groove adapted to receive the free end of the tape.

7. A take-up reel assembly for use with a tape cartridge in a cartridge-based tape transport, wherein the cartridge includes a length of tape stored on a supply reel, the take-up reel assembly comprising:

a leader block adapted to be attached to a free end of the tape and including a body having an end surface and a body cross-section shaped generally as a quadrilateral having non-perpendicular adjacent sides; and a take-up reel for receiving the tape from the cartridge and including an annular hub, the hub having an axis of rotation, an annular hub surface, and a hub slot extending from the hub surface toward the axis of rotation for receiving the leader block, the hub slot having a slot cross-section corresponding to the body cross-section.

8. The take-up reel assembly of claim 7 wherein the body cross-section is shaped generally as a parallelogram.

9. The take-up reel assembly of claim 7 wherein the leader block has a slanted groove adapted to receive the free end of the tape.

10. A leader block for use with a tape cartridge and a cartridge-based tape transport, wherein the tape cartridge includes a length of tape stored on a supply reel, and wherein the transport includes a take-up reel for receiving the tape from the cartridge, the take-up reel including an annular hub and first and second tape guides having first and second guide surfaces, respectively, that are substantially parallel to each other, the hub having an axis of rotation, an annular hub surface extending between the guide surfaces, and a hub slot extending from the hub surface toward the axis of rotation, the leader block comprising:

a body adapted to be attached to a free end of the tape and being disposable in the hub slot, the body having first and second ends, the first end being configured for coupling with a loading post of the transport, the second end having an end surface including first and second leader-block edges that extend between the guide surfaces when the body is disposed in the hub slot, at least a portion of each of the leader-block edges extending in a direction non-perpendicular to the guide surfaces when the body is disposed in the hub slot.

11. The leader block of claim 10 wherein the leader-block edges are generally straight.

12. The leader block of claim 11 wherein the leader-block edges are parallel.

13. The leader block of claim 10 wherein the body further comprises a slanted groove adapted to receive the free end of the tape.

14. A method for limiting deleterious effects resulting from imprints on a magnetic tape having multiple longitudinal tracks for storing data, wherein the imprints are caused by winding the tape around a hub and a leader block of a take-up reel assembly, the method comprising preventing all of the tracks of the tape from passing over an interface between the hub and the leader block at a particular longitudinal location on the tape as the tape is wound around the hub and the leader block.

* * * * *